United States Patent [19]
Gealer et al.

[11] 3,880,977
[45] Apr. 29, 1975

[54] PROCESS FOR THE CONVERSION OF POLYURETHANE FOAM TO A CONTINUOUS DENSIFIED SHEET OF POLYURETHANE

[75] Inventors: Roy L. Gealer, Southfield; Jacob Braslaw, Troy, both of Mich.

[73] Assignee: Ford Motor Company, Dearborn, Mich.

[22] Filed: Nov. 6, 1973

[21] Appl. No.: 413,475

[52] U.S. Cl. ............... 264/321; 264/109; 264/340; 264/DIG. 69
[51] Int. Cl..... B29c 25/00; B29d 7/14; B29d 27/00
[58] Field of Search ...... 264/54, 321, DIG. 14, 122, 264/109, DIG. 69, 340

[56] References Cited
UNITED STATES PATENTS

| | | | |
|---|---|---|---|
| 2,933,767 | 4/1960 | Vieli et al. | 264/321 X |
| 3,050,432 | 8/1962 | Weinbrenner et al. | 264/321 X |
| 3,171,820 | 3/1965 | Volz | 264/321 X |
| 3,263,010 | 7/1966 | Shultz | 264/321 X |
| 3,306,966 | 2/1967 | Matejcek et al. | 264/321 |
| 3,325,834 | 6/1967 | Lovette et al. | 264/109 X |
| 3,398,224 | 8/1968 | Spencer | 264/DIG. 14 |
| 3,443,007 | 5/1969 | Hardy | 264/54 X |
| 3,577,519 | 5/1971 | Gambardella | 264/321 X |
| 3,726,624 | 4/1973 | Schwarz | 264/109 X |
| 3,746,610 | 7/1973 | Hoegger | 264/109 X |
| 3,795,633 | 3/1974 | Golovoy et al. | 264/340 X |

OTHER PUBLICATIONS

"Hackh's Chemical Dictionary," Third Edition, completely revised and edited by Julius Grant, New York, McGraw-Hill, 1944, pp. 6, 7, 11–14.

*Primary Examiner*—Philip E. Anderson
*Attorney, Agent, or Firm*—Olin B. Johnson; Keith L. Zerschling

[57] ABSTRACT

A process is disclosed for converting polyurethane foam to useful, continuous, sheet material which comprises contacting the foam with acetic acid in aqueous solution and compressing the resultant surface-wet foam at a temperature in the range of 200°F. to 450°F. and under a pressure above about 400 psia.

5 Claims, No Drawings

PROCESS FOR THE CONVERSION OF POLYURETHANE FOAM TO A CONTINUOUS DENSIFIED SHEET OF POLYURETHANE

BACKGROUND OF THE INVENTION

Increased industrial use of polyurethane foam is creating a growing disposal problem.

A very large quantity of "new" polyurethane foam scrap is generated by industrial plants engaged in the manufacture of articles, e.g., seating, which employ foam as a cushioning element. In such operations, up to about 30 percent of the starting material may end up as scrap. A limited market exists for a portion of this new scrap.

A large and increasing quantity of "used" polyurethane foam scrap is a product of automobile shredders which now have as their primary function the recovery of metal from junked automobiles for recycling. The non-metallic components of the product from such shredders are now commonly disposed of by sanitary land fill. Aside from the complete loss of the value of such foam in this method of disposal, the increasing volume of such scrap and the cost and availability of nearby land fill sites will soon create a major disposal problem.

THE INVENTION

Polyurethane foam can be densified, i.e., reduced to about 1/40 of its volume or less, and converted into continuous, sheet material useful for a variety of packaging, covering and lining applications by wetting the foam with aqueous acetic acid and compressed in a hot roll press at a temperature in the range of about 200°F. to about 450°F., and at a pressure above about 500 psia. Advantageously, this temperature and pressure are applied for a time in the range of about 0.1 to about 15, preferably about 0.5 to about 4, minutes.

The aqueous acetic acid solution into which the foam is immersed or which is sprayed upon the foam surfaces contains about 15 to about 40 weight percent acetic acid, preferably between about 20 and about 30 weight percent. Other organic acids, e.g., formic, oxalic and tartaric, and mineral acids, e.g., sulfuric acid, can be used but all are less desirable than acetic acid in one or more of such factors as quality of the resultant film, cost and safety.

The compression rolling is advantageously carried out at pressures in the range of about 400 to about 20,000, preferably about 1000 to about 2,000 psia.

In a preferred embodiment of this process, the polyurethane foam is boiled in the aqueous solution of acetic acid for a time in excess of about 0.1 minute. Advantageously, this time is in the range of about 0.1 to about 10, preferably about 4 to about 8, minutes but may be longer if desired. It is then compressed to drain off at least about 90 weight percent of the absorbed solution to avoid excessive steam-acid release during the hot-rolling step. The hot rolling is carried out while the foam is still wet.

The polyurethane foam may be processed without shredding but, for continuity of film quality, the foam is preferably shredded. Particles having their major dimension below about 2 inches are particularly suitable for ease of handling.

Polyurethane foams are typically prepared by reacting a polyether, e.g., propylene oxide with ethylene oxide cap, with a diisocyanate, e.g., toluene diisocyanate, in the presence of an amine catalyst, e.g., methyl morpholine or N, N-diethyl ethanolamine, and a small amount of water. This reaction mixture will commonly include in minor amounts a chlorinated aromatic amine, e.g., 4, 4'-diamino, 3,5, 3', 5'-tetrachloro diphenyl methane, and an emulsifying agent, e.g., an alkylbenzene sulfonate-triethanolamine salt.

Other polyurethane foams are prepared from diisocyanates and polyesters, e.g., esters of polyhydric alcohols, e.g., 1, 4-butane diol, with polycarboxylic acids, e.g., adipic acid.

If the reaction is carried out in the presence of an activating mixture which includes water or an equivalent agent for hydrolyzing the diisocyanate, the accompanying evolution of carbon dioxide makes the mixture self-foaming so that the resulting resin block has a foamlike or cellular structure. In addition to water, such activating mixture includes generally an accelerator such as an amine, an emulsifying agent such as a sulfonated oil and an agent such as a paraffin oil for regulating the pore size in the resin foam.

Polyurethane foam production is described, for instance, in Polyurethanes, Chemistry and Technology by J. H. Saunders and K. C. Frisch, Part II - Technology, Interscience Publishers, New York (1967).

This invention will be more easily understood from the following illustrative examples.

EXAMPLE 1

A 30% acetic acid solution is prepared by adding 100 ml of glacial acetic acid to 200 ml of distilled water in a beaker. The solution is then brought to a boil on a hot plate and small chunks of polyurethane foam (diisocyanate — polyether type), i.e., average size 2 × 3 × 2 cm are added to the boiling liquid. After allowing the material to boil for about 6 minutes, it is observed that the liquid takes on a pale yellow color. The polyurethane foam structure does not collapse.

The material that has been boiled is placed in a vacuum filter and most of the liquid imbedded on it is removed. Immediately afterwards while the foam is damp, the acid treated foam is inserted into a press maintained at 300°F. and press rolled at a pressure of 1000 psia. Gas is seen to evolve. After two minutes of press processing, the resultant product is removed from the press. This product is a continuous, sheet material, i.e., polyvinyl or film much like vinyl sheet material, i.e., polyvinyl chloride, in feel to human hands with regions of very high strength where the solids are dense. The volume of this film is about 1/40 of the original volume of the polyurethane foam.

EXAMPLE 2

Cubes of polyurethane foam (diisocyanate — polyester type) measuring about 2 × 2 × 2 inches are treated under various conditions. The cubes hereinafter designated "I" are pressed to 1000 psia. at 300° F. for 2 minutes. The cubes hereinafter designated "II" are boiled in water for 1 minute, most of the water is squeezed out and the cubes are pressed to 1000 psia. at 300°F. for 2 minuts. The cubes hereinafter designated "III" are boiled in 30% acetic acid solution in water for 1 minute, most of the liquid is squeezed out and the cubes are pressed to 1000 psia at 300°F. for 2 minutes. The sheet material produced from cubes III are more resistant to shearing and stretch breakage, i.e., greater elongation-to-break than the sheet material produced from cubes I and II.

EXAMPLE 3

Scrap polyurethane is shredded into an average particle diameter of about 1/16 in. Such shredding is effected in water in a Waring blender. The shredded material is then boiled in 30% acetic acid solution in water, squeezed to remove excess liquid and immediately hot pressed as in Example 2. The film or sheet material obtained is quite similar to that produced from cubes III of Example 2 but is somewhat less resistant to tearing.

EXAMPLE 4

Another portion of the same polyurethane used in Example 3 is boiled in 30% acetic acid solution water without prior shredding, squeezed to remove excess liquid and immediately hot pressed as in Example 3. The resulting film is similar to that produced in Example 3 except that the film is somewhat more resistant to tear.

EXAMPLE 5

Polyurethane film produced from polyurethane foam with the method and conditions heretofore recited in Example 1 is affixed to the interior of a wire mesh container as a liner therefor. Unvarnished wood knobs for use as handles in furniture manufacture are packed in the container inside the liner and shipped from the site of their preparation to the sight of their use in furniture assembly.

EXAMPLE 6

The procedure of Example 1 is repeated except that the aqueous acetic acid solution is sprayed upon the foam at room temperature, the foam is squeezed to remove in excess of 90% of the retained solution and immediately pressed using the same conditions used in Example 1.

It will be understood by those skilled in the art that the foregoing examples are illustrative and that modifications thereof can be made within the scope of the invention as set forth in the appended claims:

We claim:

1. A method for converting polyurethane foam to a continuous densified sheet material which comprises contacting the foam with a 15 to 40 weight percent aqueous solution of acetic acid and compressing the resultant surface wet foam at a temperature in the range of 200°F. to 450°F. and under a pressure above about 400 psia.

2. A method in accordance with claim 1 wherein said pressure is in the range of about 400 to about 20,000 psia and is maintained for a time in the range of 0.1 to 15 minutes.

3. A method in accordance with claim 1 wherein said pressure is in the range of 1000 to 2000 psia and is maintained for a time in the range of about 0.5 to about 4 minutes.

4. A method for converting polyurethane foam to a continuous densified sheet material which comprises boiling the polyurethane foam in 15 to 40 weight precent aqueous solution of acetic acid for a time in excess of 0.1 minute and compressing the resultant surface-wet foam at a temperature in the range of 200°F. to 450°F. and under a pressure in the range of about 400 to about 20,000 psia for a time in the range of about 0.1 to about 15 minutes.

5. A method in accordance with claim 4 wherein said foam is boiled for a time in the range of 0.1 to 10 minutes and said pressure is maintained for a time in the range of 0.5 to 4 minutes.

* * * * *